United States Patent [19]

Morishita et al.

[11] Patent Number: 5,166,490
[45] Date of Patent: Nov. 24, 1992

[54] WIRE CUT ELECTRIC DISCHARGE MACHINING APPARATUS

[75] Inventors: Hiroaki Morishita; Yutaka Terada, both of Aichi; Masao Tomisawa; Yoichi Kikuyama, both of Hyogo, all of Japan

[73] Assignee: Mitsubishi Denki K.K., Tokyo, Japan

[21] Appl. No.: 591,631

[22] Filed: Oct. 2, 1990

[30] Foreign Application Priority Data

Mar. 13, 1990 [JP] Japan .................... 2-61635

[51] Int. Cl.⁵ ............................... B23H 7/10
[52] U.S. Cl. .................... 219/69.12; 226/42
[58] Field of Search ............ 219/69.12, 69.13; 226/42; 242/45

[56] References Cited

U.S. PATENT DOCUMENTS

| | | | |
|---|---|---|---|
| 3,586,222 | 6/1971 | Rosen | 226/42 |
| 4,298,781 | 11/1981 | Inoue | 219/69.12 |
| 4,581,514 | 4/1986 | Inoue | 219/69.12 |
| 4,978,828 | 12/1990 | Umetsu et al. | 219/69.12 |
| 4,985,608 | 1/1991 | Morishita et al. | 219/69.12 |
| 4,998,003 | 3/1991 | Kawanabe | 219/69.12 |
| 5,080,296 | 1/1992 | Raggio et al. | 226/42 |

FOREIGN PATENT DOCUMENTS

| | | |
|---|---|---|
| 53-84295 | 7/1978 | Japan . |
| 58-52776 | 11/1983 | Japan . |
| 125734 | 6/1986 | Japan . |
| 64-40223 | 2/1989 | Japan . |
| 2-41826 | 2/1990 | Japan . |
| 8401734 | 5/1984 | PCT Int'l Appl. . |
| 8903743 | 5/1989 | PCT Int'l Appl. . |

Primary Examiner—Geoffrey S. Evans
Attorney, Agent, or Firm—Sughrue, Mion, Zinn, Macpeak & Seas

[57] ABSTRACT

The wire cut electric discharge machining apparatus includes a tension applying device for tensing a wire electrode, an instruction signal generating device for providing a movement instruction and a tension instruction for a wire electrode, the speed detecting device for detecting an actual speed of the wire electrode, comparison circuitry for comparing the actual speed detected by the speed detecting device with an instructed speed of the movement instruction provided by the instruction signal generating device and the instruction value correcting device for correcting the tension instruction value which is provided by the instruction signal generating device according to a result of comparison of the comparison device. Hence, in the wire cut electric discharge machining apparatus, the tension of the wire electrode can be controlled with high accuracy.

3 Claims, 4 Drawing Sheets

WIRE CUT ELECTRIC DISCHARGE MACHINING APPARATUS

BACKGROUND OF THE INVENTION

This invention relates to a wire cut electric discharge machining apparatus having means for controlling the tension of a wire electrode with high accuracy FIG. 6 outlines the arrangement of a conventional wire cut electric discharge machining apparatus disclosed in Examined Japanese Patent Publication No. Sho-58-52776/(1983).

In FIG. 6, reference numeral 1 designates a workpiece to be machined; 2, a wire electrode for machining the workpiece 1; 3, a wire bobbin for supplying the wire electrode 2; 4 and 4a, a pair of wire electrode feeding rollers for feeding the wire electrode 2; 5, a constant speed motor coupled directly to the wire electrode feeding roller 4; 6 and 6a, a pair of constant torque friction rollers for giving a predetermined tension to the wire electrode 2; 7, a brake coupled directly to the friction roller 6; and 8 and 9, guide rollers provided above and below the workpiece to guide the wire electrode 2.

Further in FIG. 6, reference characters 10 and 10a designates a pair of rollers for detecting the speed of movement of the wire electrode being fed (hereinafter referred to as "a pair of first wire electrode speed detecting rollers 10 and 10a", when applicable); 11 and 11a, a pair of rollers for detecting the speed of movement of the wire electrode used (hereinafter referred to as "a pair of second wire electrode speed detecting rollers 11 and 11a", when applicable); 12, a speed detecting unit for detecting the speed of rotation of the first wire electrode speed detecting roller 10; 13, a speed detecting unit for detecting the speed of rotation of the second wire electrode speed detecting roller 11; 14, an amplifier for amplifying the output signal of the speed detecting unit 13; 15, an amplifier for amplifying the output signal of the speed detecting unit 12; 16, comparison means for comparing the outputs of the amplifiers 14 and 15; 17, machining condition control means for changing the setting of tension of the wire electrode 2 according to the output signal of the comparison means 16; 18, change over means for switching the setting of tension of the wire electrode 2 according to the output signal of the machining condition control means 17; 19, a set of resistors for switching the current flowing in the brake 7 to adjust the setting of tension of the wire electrode 2, the set of resistors 19 consisting of a resistor 19a for decreasing the tension of the wire electrode, a resistor 19b for setting a tension suitable for the diameter of the wire electrode 2, and a resistor 19c for increasing the tension of the wire electrode 2; and 20, an electric source for the brake 7.

The conventional wire cut electric discharge machining apparatus thus constructed, and operation thereof will be described hereafter:

The wire electrode 2 pulled out of the wire bobbin 3 is tensioned being held between the constant torque friction rollers 6 and 6a, and is extended through the first wire electrode speed detecting rollers 10 and 10a. The wire electrode 2 thus extended is laid over the upper guide roller 8, so that it is extended towards the workpiece 1. The wire electrode 2 thus extended, passing through the machining portion of the workpiece 1, is laid over the lower guide roller 9, so that the direction of advance of the wire electrode 2 is changed. Thereafter, the wire electrode 2 passes through the pair of second wire electrode speed detecting rollers 11 and 11a, and is then run at constant speed being held between the wire electrode pulling rollers 4 and 4a.

The tension of the wire electrode 2 is determined by the current which is supplied from the electric source 20 to the brake 7 coupled directly to the constant torque friction roller 6. On the other hand, the speed of movement of the wire electrode 2 is controlled as follows: That is, an NC (numerical control) device (not shown) provides an instruction signal to control the speed of rotation of the constant speed motor 5 coupled directly to the wire electrode pulling roller 4, thereby to control the speed of movement of the wire electrode 2.

In machining the workpiece 1, a machining power source (not shown) applies machining current to the machining gap between the workpiece 1 and the wire electrode 2, while a drive unit (not shown) moves the workpiece 1 relative to the wire electrode 2 according to a program stored in the NC device, so that the workpiece is machined into a required form.

The wire electrode feeding speed is detected by the speed detecting unit 12 coupled to the first wire electrode speed detecting roller 10, and the wire electrode winding (take-up) speed is detected by the speed detecting unit 13 coupled to the second wire electrode speed detecting roller 11. The output signals of the two speed detecting units 12 and 13 are applied through the amplifiers 15 and 14 to the comparison means 16, the output signal of which is applied to the machining condition control means 17. Normally, the change-over means 18 selects the resistor 19b. When the wire electrode winding speed is higher than the wire electrode supplying speed, the tension of the wire electrode 2 is increased. In this case, the machining condition control means 17 applies an output signal to the change-over means 18, so that the latter 18 selects the resistor 19a, as a result of which the set tension of the wire electrode 2 is decreased. When, on the other hand, the wire electrode feeding speed is higher than the wire electrode winding speed, the tension of the wire electrode 2 is decreased. In this case, the machining condition control means 17 applies an instruction signal to the change-over means 18, so that the latter 18 selects the resistor 19c to increase the set tension of the wire electrode.

That is, the tension of the wire electrode is so controlled that the elongation rate of the wire electrode 2 between before and after the machining is maintained in a predetermined range.

The conventional wire cut electric discharge machining apparatus thus constructed requires the speed detecting unit for detecting the wire electrode winding speed. And, since the set tension of the wire electrode is changed stepwise with the change-over means, the tension cannot be adjusted with high accuracy, and accordingly the workpiece is decreased in machining accuracy.

Further, when the wire is passed through an initial hole by an automatic wire supplying apparatus, tho probability of success to pass the initial hole is decreased.

SUMMARY OF THE INVENTION

An object of this invention is to eliminate the above-described difficulty accompanying a conventional wire cut electric discharge machining apparatus. More specifically, an object of the invention is to provide a wire cut electric discharge machining apparatus in which the tension of the wire electrode can be controlled with high accuracy without a speed detecting unit for detecting a wire electrode winding speed.

The foregoing object of the invention has been achieved by the provision of a wire cut electric discharge machining apparatus according to the invention comprises: tension applying means for tensing a wire electrode; instruction signal generating means for providing a movement instruction and a tension instruction for the wire electrode; speed detecting means for detecting the actual speed of the wire electrode; comparison means for comparing the actual speed detected by said detecting means with an instruction speed of the movement instruction provided by the instruction signal generating means; and instruction value correcting means for correcting the tension instruction value provided by the instruction signal generating means according to a result of comparison of the comparison means.

In the wire cut electric discharge machining apparatus according to the present invention, the tension of the wire electrode can be controlled with high accuracy even if varied, as a result of which the machining accuracy is markedly improved.

DETAILED DESCRIPTION OF PREFERRED EMBODIMENT

A first embodiment of this invention, a wire cut electric discharge machining apparatus, will be described with reference to FIG. 1.

Figure 1:
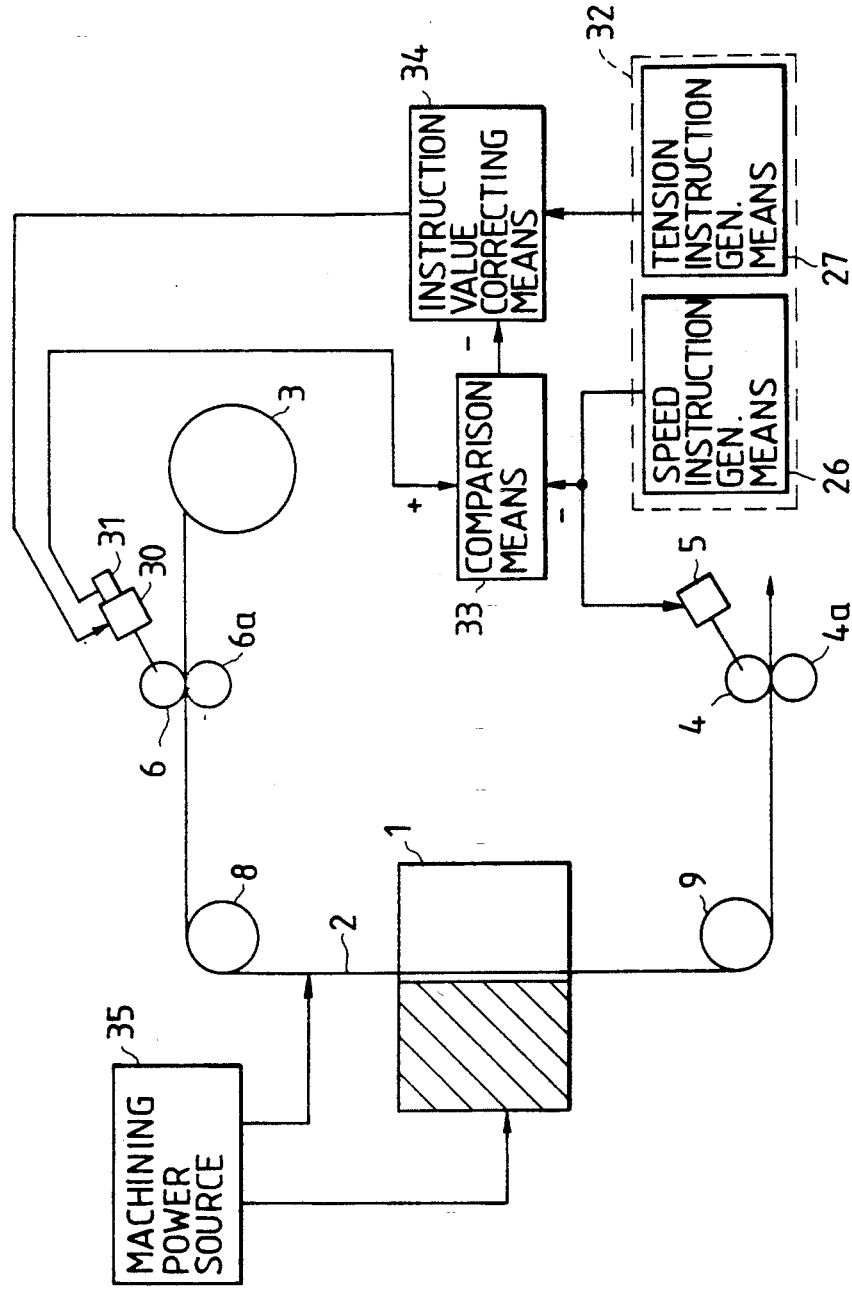
FIG. 1 is an explanatory diagram outlining arrangement of a wire cut electric discharge machining apparatus, a first embodiment of this invention.

In FIG. 1, reference numeral 1 designates a workpiece to be machined; 2, a wire electrode for machining the workpiece 1; 3, a wire bobbin from which the wire electrode 2 is supplied; 4 and 4a, a pair of wire electrode pulling rollers for pulling the wire electrode 2; 5, a constant speed motor coupled directly to the wire electrode pulling roller 4; 6 and 6a, a pair of constant torque friction rollers for giving a desired tension to the wire electrode 2; 8 and 9, guide rollers provided above and below the workpiece 1 to guide the wire electrode 2; 30, a DC motor coupled directly to the friction roller 6; 31, a tachometer generator which is connected directly to one shaft of the DC motor 30 which is opposite to the other shaft which is coupled to the friction roller 6; 32, instruction signal generating means including speed instruction generating means 26 for producing a movement instruction for the wire electrode 2, and tension instruction generating means 27 for providing a tension instruction for the wire electrode 2; 33, comparison means for comparing the instruction speed of the wire electrode 2 from the speed instruction signal generating means 26 and the output signal of the tachometer generator 31; 34, instruction value correcting means for correcting the tension instruction value provided by the tension instruction signal generating means 27 according to the output signal of the comparison means 33; and 35, a machining power source.

Figure 2:
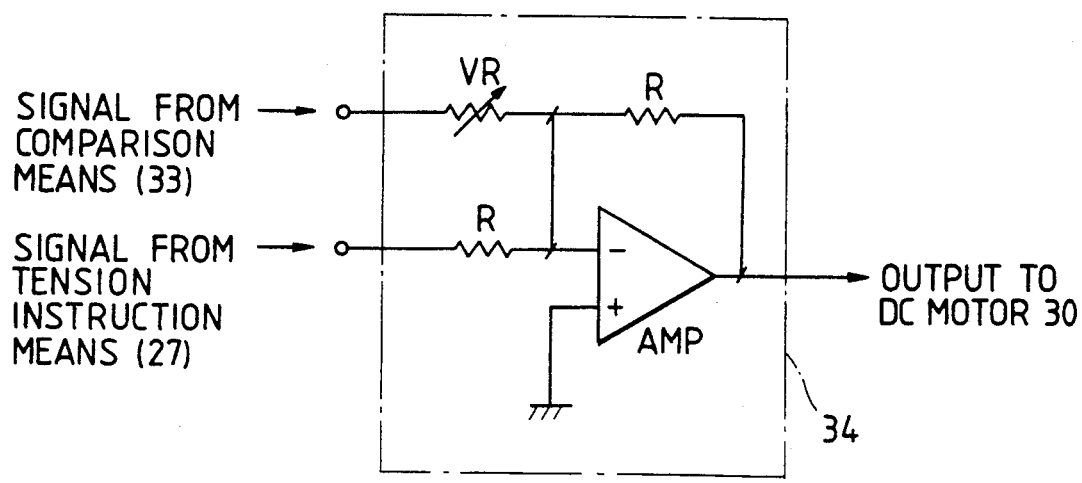
FIG. 2 is a circuit diagram showing one example of instruction value correcting means.

FIG. 2 is a circuit diagram showing an example of the instruction value correcting means. The instruction value correcting means 34 comprises resistors R and R, a variable resistor VR, and an amplifier AMP. In such circuit, an amount of correction is varied by a variable resistor VR according to the output from the comparison means 33 in order to correct the tension of the wire electrode. 2

The instruction value correcting means 34 operates to feed-back a part of the difference between the instruction speed of the wire electrode 2 provided by the speed instruction generating means 26 and the output of the tachometer generator 31 to the tension instruction value provided by the tension instruction generating means 27, thereby to adjust (increase or decrease) of the tension instruction value in association with the behavior of the wire electrode moving system.

The wire cut electric discharge machining apparatus thus constructed operates as follows:

The wire electrode 2 supplied from the wire bobbin 3 is tensioned being held between the pair of constant torque friction rollers 6 and 6a, and is laid over the guide roller 8 so that the direction of movement of the wire electrode 2 is changed; that is, the wire electrode 2 is fed to the machining part of the workpiece 1. After passing through the workpiece 1, the wire electrode 2 is laid over the lower guide roller 9 so that its direction of movement is changed again. The wire electrode 2 thus laid is held between the pair of wire electrode pulling rollers 4 and 4a so that it is moved at a constant speed. The tension and the speed of the wire electrode are determined by the instruction signals provided by the instruction signal generating means 32.

In machining the workpiece 1, the machining power source 35 applies machining current to the machining gap between the workpiece 1 and the wire electrode 2, while a drive unit (not shown) moves the workpiece 1 and the wire electrode 2 relative to each other according to a program stored in the instruction signal generating means 32, so that the workpiece is machined into a required form.

With the wire cut electric discharge machining apparatus, the tension of the wire electrode 2 is controlled as follows:

the wire electrode 2 is moved at a constant speed by the constant speed motor 5 coupled directly to the wire electrode pulling roller 4. A certain tension is applied to the wire electrode 2 by controlling the torque of the DC motor 30 coupled directly to the constant torque friction roller 6.

In the wire electrode moving system, a spring math system is formed by the inertial moments of the wire bobbin 3, the rollers and the motors with the wire electrode 2 as a spring. Hence, it is impossible to control the variation in tension of the wire electrode 2, which is due to the natural frequency of the wire electrode moving system, only with the above-described wire electrode tension controlling system. If, when the tension changes in the above-described manner, a tension greater than the tensile strength of the wire electrode 2 is applied to the latter 2, then the wire electrode 2 is broken so that the machining operation is suspended; and in addition the machined surface is scratched by the vibration of the wire electrode 2 which is caused by the variation in tension,.

In order to eliminate this difficulty, fundamentally the torque of the DC motor 30 is controlled so that the tension of the wire electrode 2 is maintained constant. That is, the following method is employed when the tension is changed by the natural frequency of the wire electrode moving system: When the actual tension of the wire electrode 2 is increased, the set tension of the wire electrode 2 is decreased, whereas when the actual tension is decreased, the set tension is increased.

In the wire cut electric discharge machining apparatus according to the invention, the speed of rotation of the DC motor 30 is detected by using the tachometer generator 31, and the speed of rotation of the DC motor thus detected is compared with the speed instruction value, as the wire electrode moving speed, provided by the speed instruction generating means 26 in the comparison means 33. When the tension is maintained unchanged, the comparison means provides no output signal, so that the tension of the wire electrode 2 is not changed. If the tension of the wire electrode 2 is increased, the constant torque friction roller 6 is pulled, and the speed of the DC motor is increased accordingly. As a result, a positive signal is applied to the comparison means 33, so that the wire electrode tension instruction value outputted by the tension instruction generating means 27 is decreased by the instruction value correcting means 34, and the instruction value thus decreased is applied to the DC motor 30.

When the tension of the wire electrode 2 is decreased, the DC motor 30 is rotated slowly, as a result of which a negative signal is applied to the comparison means 33. Hence, the wire electrode tension instruction value provided by the tension instruction generating means 27 is increased by the instruction value correcting means 34, and the instruction value thus increased is applied to the DC motor 30.

Thus, the wire electrode 2 is maintained constant in tension between the constant torque friction roller 6 coupled to the DC motor and the wire electrode pulling roller 4.

In the above-described embodiment, the wire electrode moving speed instruction and the wire electrode tension instruction are provided by the instruction signal generating means 32; however, the embodiment may be so modified that these instructions are provided by separate units, respectively. Furthermore, in the above-described embodiment, the wire electrode is tensioned with the DC motor; however, it may be tensioned with an AC motor whose torque can be controlled. The same effect may be obtained by using a brake.

In the above-described embodiment, the tachometer generator coupled to the DC motor is employed to detect the wire electrode supplying rate; however, the invention is not limited thereto or thereby. For instance, similarly as in the above-described conventional wire cut electric discharge machining apparatus, a wire electrode supplying speed detecting roller, and a speed detecting unit may be provided. That is, in order to detect the wire electrode supplying rate, the embodiment may be changed or modified in various manners.

Figure 3:
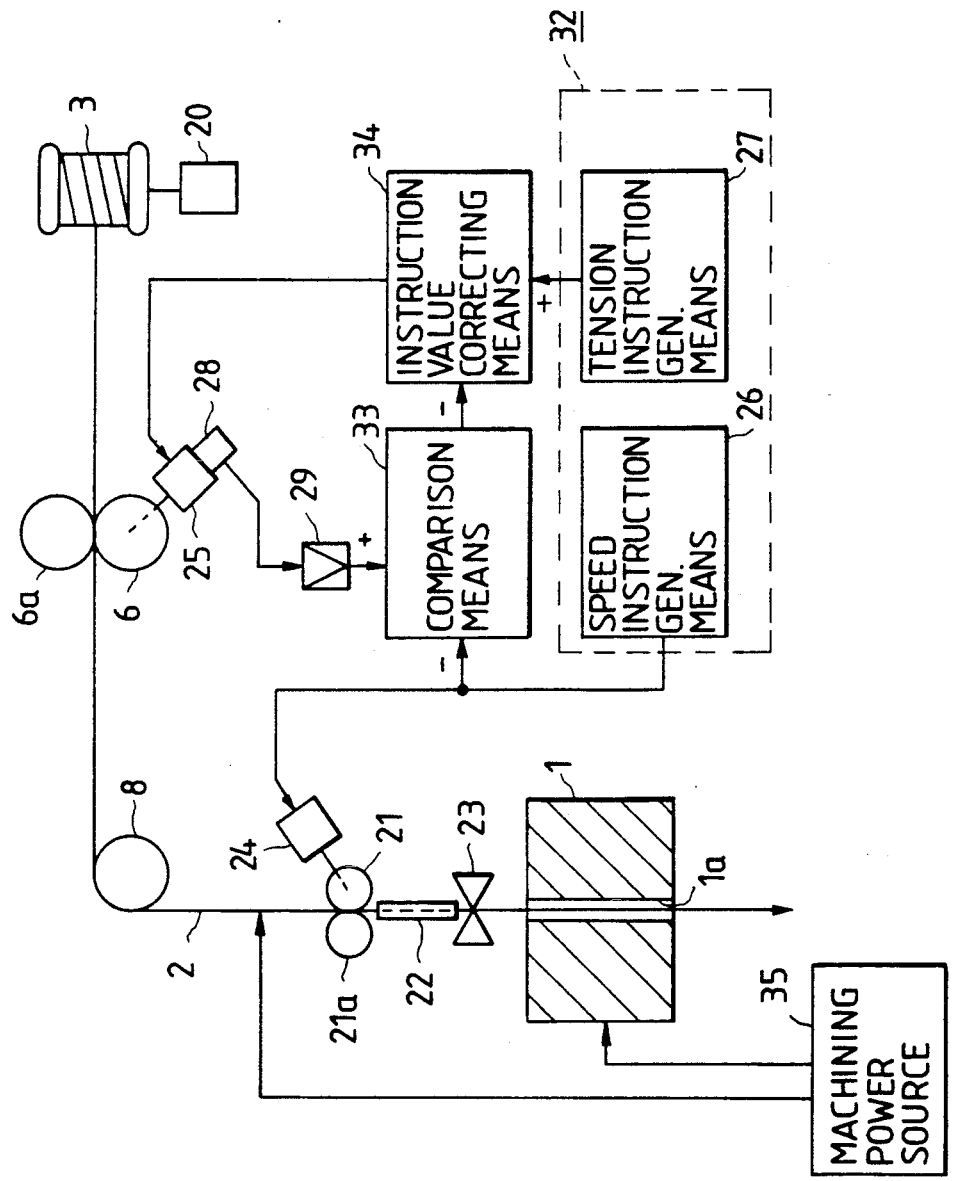
FIG. 3 is an explanatory diagram outlining the arrangement of a wire cut electric discharge machining apparatus, a second embodiment of the invention.
Figure 6:
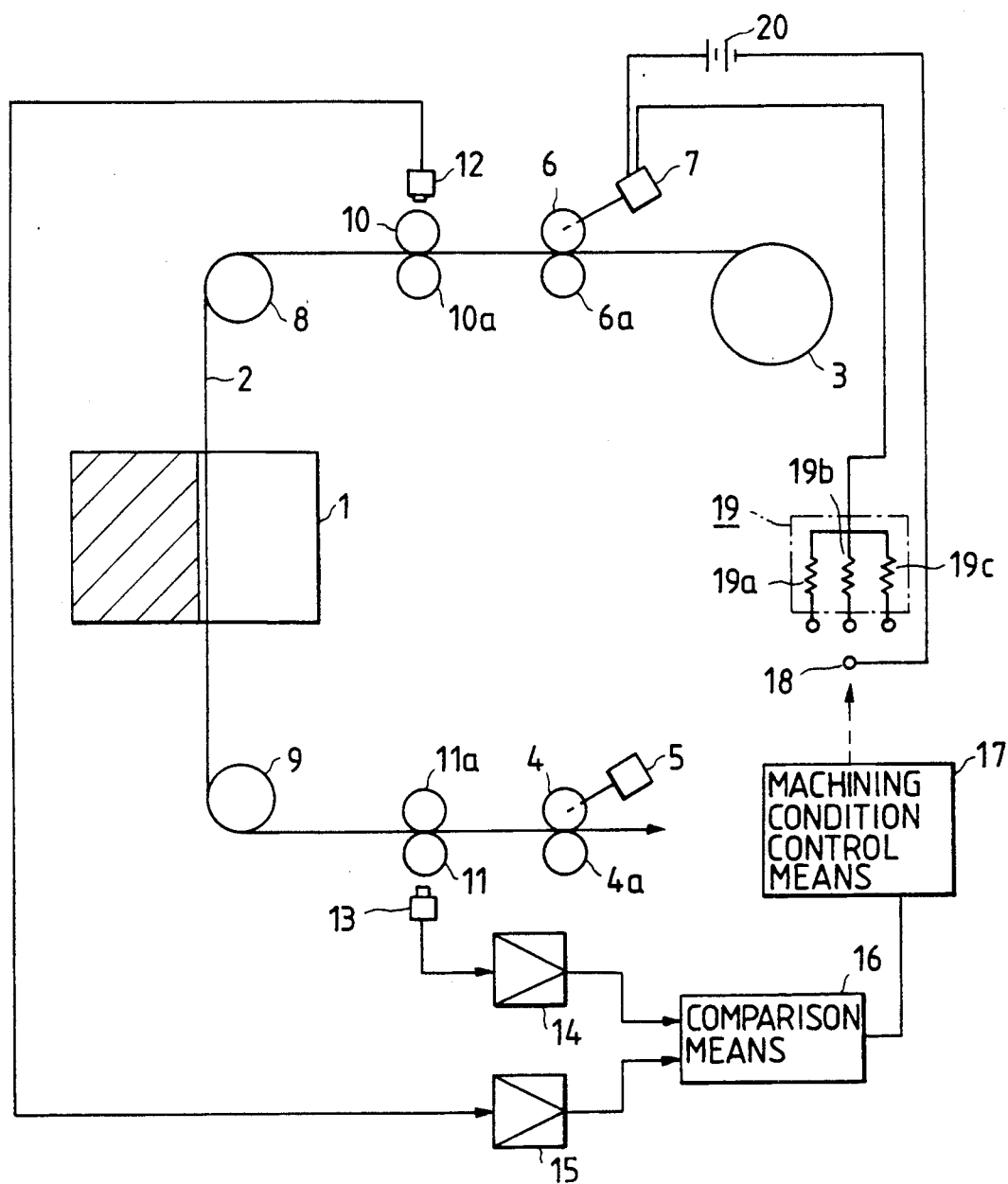
FIG. 6 an explanatory diagram outlining the arrangement of a conventional wire cut electric discharge machining apparatus.

FIG. 3 shows a second embodiment of the invention. In the embodiment, the technical concept of the invention is applied to the automatic wire electrode supplying operation in a wire cut electric discharge machining apparatus with an automatic wire electrode supplying device.

In FIG. 3, reference character 1a designates an initial hole about 0.5 mm in diameter which is formed in a workpiece 1; 2, a wire electrode about 0.1 mm to 0.3 mm in diameter for machining the workpiece 1; 3, a wire bobbin on which the wire electrode 2 has been wound; 20, a pretension motor coupled to the shaft of the wire bobbin 3; 6 and 6a, a pair of brake rollers for tensing the wire electrode 2; 8, a guide roller provided above the workpiece 1 to change the direction of advance of the wire electrode 2; 21 and 21a, a pair of feed rollers for sending the wire electrode 2 into the initial hole 1a of the workpiece 1; 22, a guide pipe for guiding the wire electrode 2; 23, an upper wire guide for supporting the wire electrode 2 above the workpiece 1; 24, a feed motor coupled directly to the feed roller 21; 25, a brake coupled directly to the brake roller 6; 26, speed instruction generating means for applying a rotation speed instruction value to the feed motor 24; 27, tension instruction generating means for applying a torque instruction value to the brake 25; 28, a tachometer generator connected directly to one end portion of the shaft of the brake 25 to the other end portion of which the brake roller 6 is connected; 29, an amplifier for amplifying the output signal of the tachometer generator 28; 33, comparison means for comparing the output of the amplifier 29 with the signal of the feed roller 21 which is controlled by the speed instruction generating means 26; and 34, instruction value correcting means for correcting the signal of the tension instruction generating means 27 according to the output signal of the comparison means 33. The speed instruction generating means 26 and the tension instruction generating means 27 form instruction signal generating means 32.

The operation of the second embodiment thus constructed will be described.

The wire electrode 2 supplied from the wire bobbin 3 is tensioned being held between the brake rollers 6 and 6a, and laid over the guide roller 8 and held between the feed rollers 21 and 21a. Thus, the wire electrode 2 is run at a constant speed. The wire electrode 2 passes through the guide pipe 22, and is inserted into the initial hole 1a of the workpiece 1 while being positioned by the upper wire guide 23 relative to the workpiece piece 1. The pretension motor 20 is connected to the shaft of the wire bobbin 3 to give a light tension of the order of 200 g to the wire electrode so that the latter may not be slackened between the wire bobbin 3 and the brake rollers 6 and 6a. The tension applied to the wire electrode 2 is determined by the current flowing in the brake 25 coupled directly to the brake roller 6, and the current is determined by the output signal of the tension instruction generating means 27. The speed of insertion of the wire electrode 2 into the initial hole 1a of the workpiece 1 is determined by the voltage which is applied to the feed motor 24, and the voltage is determined by the speed instruction generating means 26. On the other hand, the speed of rotation of the brake 25 is detected by the tachometer generator 28 coupled directly to the brake 25. In the comparison means 33, the signal for the feed roller 21 which is supplied from the speed instruction generating means 26 is compared with the wire electrode movement speed signal provided by the brake section. The amplifier 29 is to match the signal of the feed roller 21 from the speed instruction generating means 26, and the wire electrode movement speed signal provided by the brake section with each other in the characteristic of output. The instruction value correcting means 34 corrects the signal of the tension instruction generating means 27 according to the output signal of the comparison means 33, thereby to adjust (increase or decrease) the current applied to the brake 25, to stabilize the tension of the wire electrode moving system. For instance when the speed instruction value is larger than the speed of movement of the wire electrode in the brake section, in the wire moving system the tension is decreased. Hence, a negative signal corresponding to the difference between the speed instruction value and the speed of movement of the wire electrode is outputted by the comparison means 33, so that the instruction value correcting means 34 corrects the output signal of the tension instruction generating means 27 so as to increase the tension. On the other hand, when the speed instruction value is smaller than the speed of movement of the wire electrode in the brake section, in the wire moving system the tension is increased. Hence, a positive signal corresponding to the difference between the speed instruction value and the speed of movement of the wire electrode is outputted by the comparison means 33, so that the instruction value correcting means 34 corrects the output signal of the tension instruction generating means 27 so as to decrease the tension.

Figure 4:
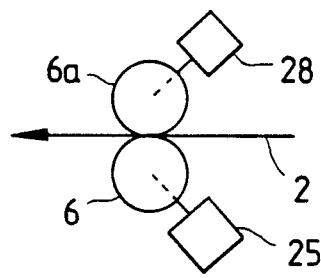
FIGS. 4 and 5 are explanatory diagrams showing modifications of the electric discharge machining apparatus shown in FIG. 3.
Figure 5:
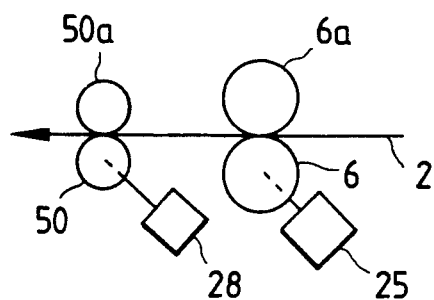

In the above-described embodiment, the speed of the wire electrode 2 in the brake section is detected with the tachometer generator 28 coupled directly to the brake 25. However, the same effect can be obtained by modifying the embodiment as shown in FIGS. 4 and 5. In FIG. 4, the tachometer generator 28 is connected directly to the shaft of the brake roller 6. In FIG. 5, a pair of speed detecting rollers 50 and 50a are additionally provided, and the tachometer generator 28 is coupled to the speed detecting roller 50.

In the above-described embodiment, the speed of the wire electrode is detected by the tachometer generator; however the same effect can be obtained by a method in which an encoder is employed to detect the speed of movement of the wire electrode through frequency-to-voltage conversion.

Furthermore in the above-described embodiment, the brake is employed as an actuator for tensing the wire electrode 2; however, the same effect can be obtained by an electric motor such as a DC motor or AC motor.

Moreover in the above-described embodiment, the motor, the brake, the tachometer generator, and the encoder are coupled directly to the rollers; however, the same effect can be obtained by connecting them through gears or the like to the rollers so that their speeds are reduced.

What is claimed is:

1. A wire cut electric discharge machining apparatus comprising:
    tension applying means for tensing a wire electrode;
    instruction signal generating means for providing a movement instruction and a tension instruction for said wire electrode, said tension instruction being applied to said tension applying means for tensing said wire electrode in a variable amount;
    speed detecting means for detecting an actual speed of said wire electrode;
    comparison means for comparing said actual speed detected by said speed detecting means with a speed of said wire electrode of said movement instruction provided by said instruction signal generating means; and
    instruction value correcting means for increasing or decreasing said tension instruction applied from said instruction signal generating means to said tension applying means according to an output of said comparison means, said output being representative of a portion of the difference between said movement instruction and said actual speed detected by said speed detecting means.

2. A wire cut electric discharge machining apparatus as claimed in claim 1, wherein said instruction signal generating means comprises a speed instruction generating means and a tension instruction generating means.

3. A wire cut electric discharge machining apparatus as claimed in claim 1, wherein said speed detecting means comprises a tachometer generator directly connected to said tension applying means.

* * * * *